United States Patent [19]
Richards

[11] 3,938,789
[45] Feb. 17, 1976

[54] METALLURGICAL COOLING PANEL

[76] Inventor: Raymond E. Richards, 36227 Ridge Road, Willoughby, Ohio 44094

[22] Filed: Dec. 5, 1973

[21] Appl. No.: 422,026

[52] U.S. Cl. .................................................. 266/16
[51] Int. Cl. ............................................. C21c 5/40
[58] Field of Search ........ 122/6 A, 7 A; 266/16, 15, 266/35, 36 P

[56] References Cited
UNITED STATES PATENTS
3,445,101  5/1969  Reighart ............................... 266/16
3,661,372  5/1972  Mitchell et al ........................ 266/15

*Primary Examiner*—Gerald A. Dost

[57] ABSTRACT

A panel for use in metallurgical type furnaces comprising a pair of outwardly disposed metal plate members spaced apart and joined together at their edges to provide a fluid transmitting passageway with at least one of the plate members including laterally spaced corrugations defining parallel channels in the passageway for directing fluid flow longitudinally of the panel. Manifold members are disposed at the opposed ends of the plate members and communicate therewith with one of the plate members terminating interiorly of at least one of the manifold members and in laterally offset relation to the other plate member for uniformly controlling fluid flow for heat transfer exteriorly of the panel.

13 Claims, 7 Drawing Figures

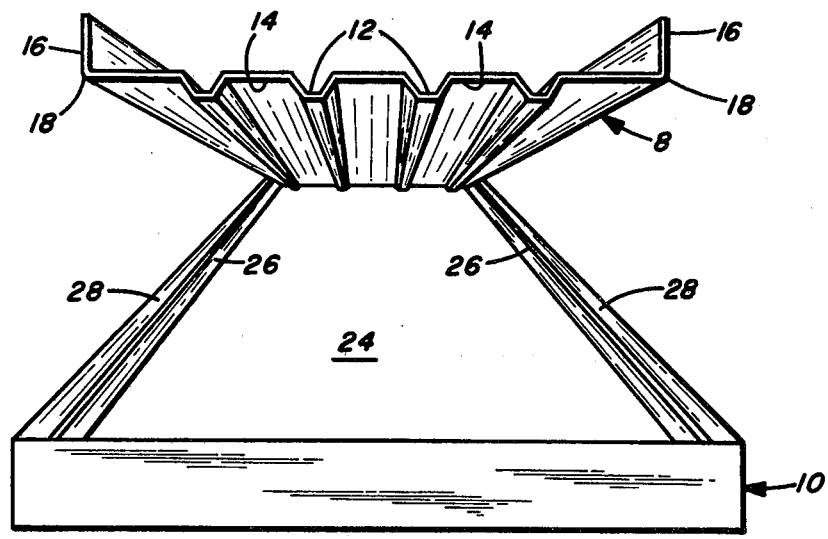
FIG. 3
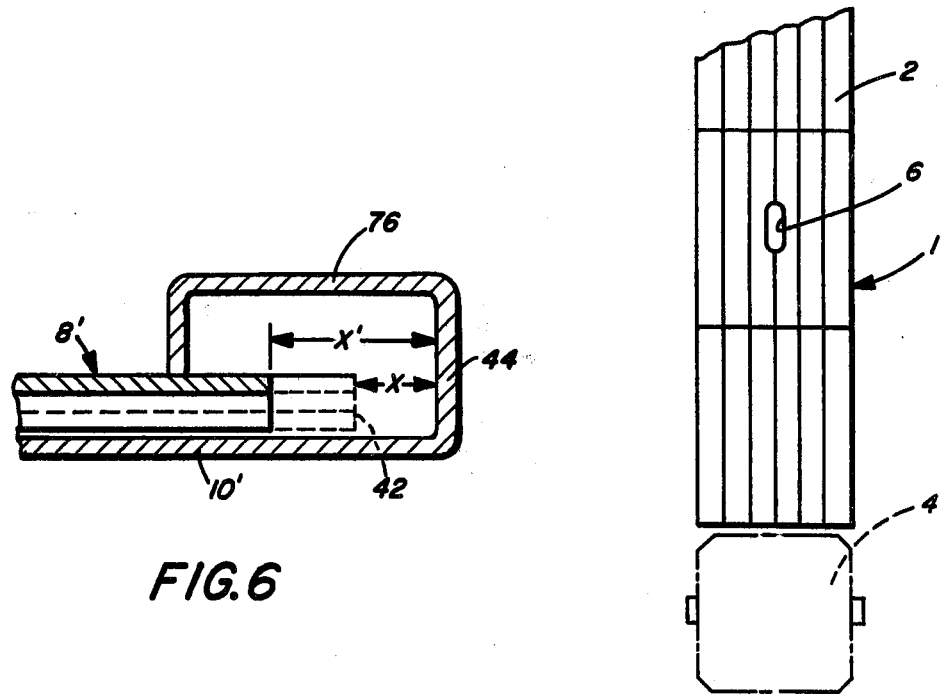
FIG. 6
FIG. 4

METALLURGICAL COOLING PANEL

BACKGROUND OF THE INVENTION

The present invention relates to internally cooled panels for metallurgical furnaces, and more particularly relates to an improved construction and arrangement for water-cooled panels adapted for use in assembly into fume hoods, ducts or the like, for metallurgical furnaces, such as basic oxygen furnace, electric furnace, converters and the like. This invention relates to and constitutes a modification over the type of panel and fume hood assembly contained in U.S. application Ser. No. 572,403 filed Aug. 15, 1966 to June H. Reighart, now U.S. Pat. No. 3,445,101.

Heretofore, such panels have been employed in sections and/or assembled into fume hoods for transmitting gasses emitted during operation of the furnace to a stack where they are cooled for ultimate disposition so as to avoid the loss of such gasses and to prevent contamination of the atmosphere. The individual panels, or sections, from which the hood may be assembled are water-cooled in order to protect the hood as well as to aid and cool the gasses emitted during the oxygen blow. By reason of the high temperatures and velocities with which the gasses contact the hood, the water-cooled linings of the hood are subject to rapid deterioration and require frequent repair and/or replacement. Moreover, as there is a considerable difference in temperature between the hot and cold sides of the panel, there results a greater expansion of the metal on the hot side. This heat differential causes the panel to buckle or to warp generally in a vertical direction requiring frequent repair and/or replacement. Specifically, the drastic temperature differentials encountered during the oxygen blow initiates internal stresses in the component parts of the panel and/or fume hood assembly which results in a tendency for the parts to pull and/or tear apart, particularly at the weld joints. Accordingly, in addition to the cost of repair and/or replacement of the panel, the loss of production time during the replacement period represents a considerable increase in production costs.

In addition to the foregoing, the panels should be constructed and arranged to provide an optimum uniform longitudinal coolant flow through the panel with minimum cross flow or channeling for maximum heat transfer. More specifically, the panel of the present invention is constructed and arranged to provide a more uniform and controlled flow of coolant through the panel so as to minimize the diffusion type effect, particularly in the manifolds, so as to remove the concentration of stresses at the weak points, such as the weldments, and so as to otherwise avoid hot spots and failures which have heretofore occurred with prior art panels. Manifestly, by this improved arrangement, the life of each panel may be prolonged so as to increase the over-all efficiency of the furnace operation.

In accordance with one aspect of the present invention, the panels are formed so as to reduce welds, both on the inside and outside of the hot face so that a practically seamless face is presented to the fume, while retaining the necessary resistance to movement under hydrostatic pressure. The panels thus formed provide single-pass unidirectional fluid flow which is non-turbulent so as to effectively wash the panel hot face plate. Preferably, the desired spacing between the hot and cold face plates is achieved by plug welds extending axially thereof, insuring equalization of pressure in all fluid passageways with controlled interflow between passageways. The turbulence-free flow thus obtained has marked advantages; the flow pattern takes maximum advantage of natural convection forces in all vertical and inclined panels. The flow resistance is minimal, thus reducing pressure drop through the panel and reducing the possibility of hose, fitting and pipe leaks, extending pump life, and allowing more water to flow through the panels for a given supply pressure. The flow is without eddy-currents and sharp bends which tend to cause bubbling and to precipitate solids in the water. The smooth stream prevents dead spots for contaminants to settle and accumulate. These advantages give extended trouble-free service life to the panels.

BRIEF DESCRIPTION OF THE DRAWINGS

FIG. 3 is an assembly view in perspective of two sheet members shaped to form the corrugated cold face and a smooth hot face respectively;

FIG. 4 is a front elevation view of a fume hood showing the general assembly using panels of the invention;

FIG. 6 is a fragmentary, section view on an enlarged scale taken along the line 6—6 of FIG. 5.

DESCRIPTION OF THE PREFERRED EMBODIMENTS

Figure 1:
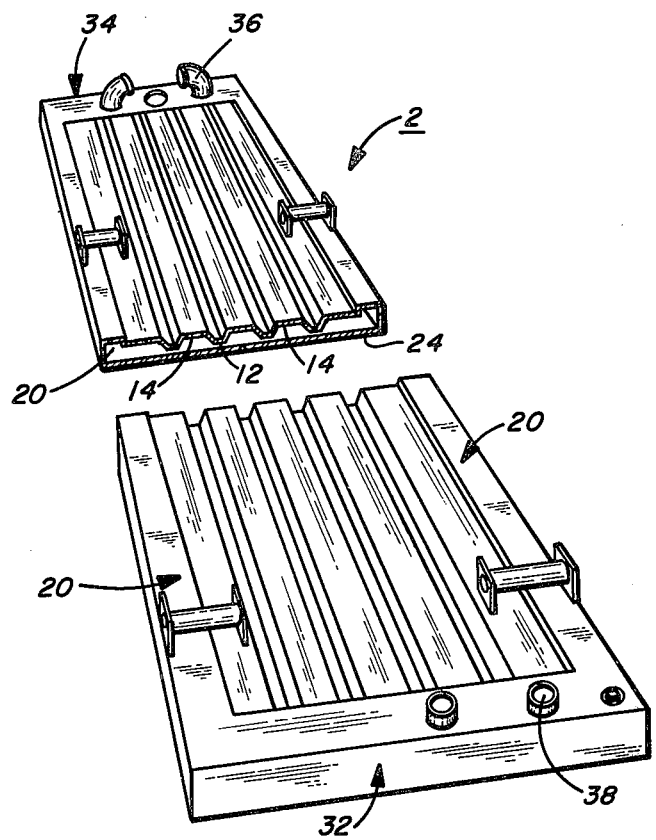
FIG. 1 is a generally perspective view, partly in section, illustrating a panel made in accordance with the present invention.
Figure 2:
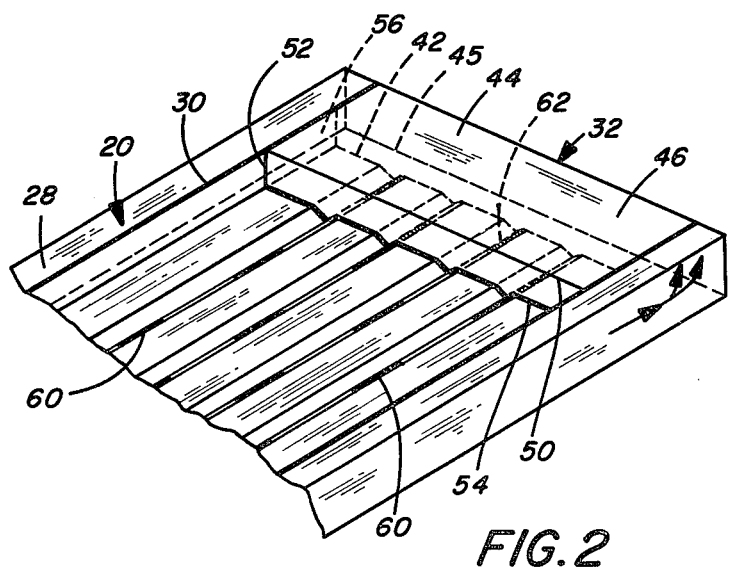
FIG. 2 is a fragmentary, generally perspective view looking at one end of the panel of FIG. 1.

Referring now again to the drawings, there is illustrated in FIGS. 1 to 3 a water cooled panel of the present invention, designated generally as 2, for use in a fume hood assembly 1 (FIG. 4). As shown, the fume hood is disposed over a furnnace 4, such as a basic oxygen furnace, for connection to a conventional stack (not shown) through which the fumes pass on their way to a dust separator or other recovery equipment, as desired. In FIG. 4, there is illustrated an aperture, or opening 6, through which the conventional type oxygen lance (not shown) may be inserted into the furnace. The panels, designated generally as 2' are modifications of the panels of the invention constructed and arranged to be disposed around the opening 6. As shown, the panels in the upper sections of the fume hood are rectangular in configuration, while the panels in the flared out lower portion are constructed and arranged to accomodate the cleared configuration. In the invention, the configuration of the fume hood can take various designs dependent upon the particular location of the furnace, the adjoining equipment and the stack to which the hot gasses are to be delivered from the fume hood.

As best seen in FIGS. 1 to 3, the panel 2 may be of a polygonal configuration, such as rectangular, triangular configuration or the like, including an upwardly facing cold face member 8 for securement in a hot face member 10. The cold face member 8 may be fabricated from a piece of plate steel having a series of grooves or corrugations, as at 12, extending axially thereof and disposed in symmetric width-wise spaced relation transversely thereof. By this arrangement, the strength of the panel against vertical bending is achieved to withstand the buckling and other strain to which the panel may be exposed during normal usage. While the corrugations in the form shown are disposed on one side of the cold face member 8, it is to be understood that the corrugations may be placed on both faces of the panel with the corrugations in one face, either directly opposite or disposed in staggered relationship to the corrugations in the other face. Further, the depth, or crest, of the corrugations can be sufficient as to cause contact between the two faces 8 and 10 or can be of a lesser dimension to prevent actual contact between the faces. For example, it is sometimes desirable to prevent actual contact between the corrugations and faces, and thereby allow a flow of water therebetween in order to prevent deposits from accumulating. Such accumulations decrease the heat transfer from the metal to the circulating water and thereby reduce the efficiency of cooling.

In the present invention, the expression "corrugations" as employed herein describe linear indentations or curves in either the cold face member 8 or the hot face member 10. The expression is used herein to denote linear indentations, curved valleys or grooves impressed in one direction into the otherwise flat surface of the respective member which can be made by rolling or forming, as desired. In other instances, the depressions can be singly rolled in a sheet or a pre-fabricated corrugated plate may be employed, if desired.

In the invention, the number of corrugations and the spacing between corrugations in the particular face member will depend, among other things, upon the increase in strength desired. For example, the strength desired depends somewhat upon the shock temperature to be encountered, the number of corrugations required being correspondingly increased with a greater thermal shock to which the panels may be exposed. The depth or thickness of the passageways or channels, as at 14, between the two face members, or in other words, the distance between the hot and cold faces, may vary depending on whether it is desirable to have a high or low flow velocity through the channel, as well as the quantity of the cooling mixes required. The size and shape of the panels is generally dependent upon the particular application and location of the panel. The thickness of the steel plate employed being preferably between ¼ inch to ½ inch.

To provide optimum strength and to achieve longitudinal fluid flow, with minimum cross-over between channels, it is preferred that the corrugations extend a sufficient depth into the space defined by the two face members. This depth may range from that desired to give the minimum increase in strength to the maximum possible distance, which is the full distance between the two face members, and which maximum distance will vary in accordance with variations in the space between the face members. Preferably, the corrugations extend at least a distance twice the thickness of the plate, or to a distance of at least ½ inch for ¼ inch thick plate. Moreover, by this arrangement, there is not only provided an increased panel strength to withstand thermal shock, but such corrugations act to prevent cross flow or angular flow through the panel, thereby providing a more uniform longitudinal flow throughout the interior of the panel. Such avoidance of channeling in the flow of the cooling medium through the panel enables a more uniform cooling of the panel thereby obviating the heating with the resultant formation of hot spots and failures in the panel.

As best seen in FIG. 3, the cold face member 8 is dimensioned so as to be fitted within the interior of the hot face member 10. In the form shown, the cold face member 8 has its lateral edges 16 bent upwardly at right angles to the general horizontal plane, as at 18, of the member 8 to provide longitudinally extending edges which define the interior wall which form side rail channels 20 (FIG. 2) that extend lengthwise of the panel.

In the embodiment shown, the hot face member 10 includes a generally flat, smooth bottom surface 24 (FIG. 3), thereby to avoid the build-up of slag particles, etc., on the surface of the panel. This surface, in the form shown, is bent upwardly 90° to provide lateral side walls 26 which, in turn, are turned inwardly 90° to form top rails 28 which extend generally parallel to the surface 24. The lateral edges 16 of the hot face member 8, together with the edges 26 and top rails 28, define the closed channels 20 which extend throughout the length of and along the opposed sides of the panel. Accordingly, the upper terminal ends of the lateral edges 16 are made integral, such as by welding or the like, to the outer terminal edge, as at 30 (FIG. 2), of the top rails 28 so as to provide a fluid type closure defining the channels 20 for communication with manifold headers disposed at opposite ends of the panel.

As best illustrated in FIG. 1, the panel 2 is provided with a pair of oppositely disposed manifolds or headers 32 and 34 which communicate with each of the individual channels, as at 14, for transfer of fluid flow from end-to-end interiorly of the panel. As shown, suitable connectors 36 can be secured to the manifold 34 for connection to a suitable fluid source of water (not shown) so that water may be circulated longitudinally through the channels 14 out through the manifold 32 via outlets 38. Similarly, the side rail channels 20 communicate at their opposed ends with the respective headers 32 and 34 maximizing longitudinal circulation through the panel between the hot and cold face members. In the embodiment illustrated, the manifolds are generally of an identical construction, whereas, the openings may be provided for water inlet or outlet from either end as desired.

In accordance with the present invention, to improve strength characteristics to withstand heat differentials with resultant stresses and to provide improved control of fluid flow through the panel, an improved construction and arrangement of the hot face, cold face and manifold members are provided to achieve an optimum synergistic heat transfer result. To achieve this purpose, the cold face member is extended interiorly of the manifold 32 (FIG. 2) a predetermined distance, as at X, so as to terminate interiorly of the manifold to enable fluid flow in the direction, as shown by the arrows. Specifically, the terminal end edge, as at 42, of the cold face member 8 terminates a predetermined lineal distance, as at X, from the confronting interior surface of the wall 44 defining the end of the manifold 32. In the invention, the distance X is related to the pipe inlet diameter to achieve turbulence free-flow for maximum heat exchange to the coolant fluid. For example, a pipe with an inlet (O.D.) diameter of 3 inches would provide a minimum distance X of 1¾ inches. Similarly, an inlet diameter of 8 inches would provide a minimum distance X of 4¼ inches. Preferably, the ratio of the distance X to the pipe inlet diameter is in the range of 1:2.

In forming this construction, the bold face member 8 is mounted within the hot face member 10 as aforementioned, and the manifold then simply installed over the cold face member. For example, the end wall 44 is bent upwardly at right angles, as at 45, and the outer top of the manifold 46 is welded along the edges, as at 48, to the top rails 28 while the inner right angle face 50 of the manifold is welded, as at 52, at its opposed ends to the confronting interior lateral edge 16 of the cold face member 8 and, hence, axially inwardly of the terminal end of the lateral edge 16 defining the channel 20. The inner face 50 of the manifold is cut so as to have a shape corresponding to the confronting exposed side of the cold face member containing the corrugations 12 and channels 14 and is secured thereto, as at 54. Accordingly, the interior face 50 of the manifold is welded at its opposed edges, as at 52, to the confronting interior lateral edges 16 of the cold face member 8 thereby to eliminate a bend point or corner combination at intersections of 30, 52 and 54, as would be the case with welding abutting edges, as for example in U.S. Pat. No. 3,445,101. By this arrangement, there is provided an improved construction which acts to prevent stresses, deformation and warp which would ordinarily take place adjacent the corner juncture, as at 52, due to the heat differential resulting from heat transfer between the hot and cold faces of the panel. In addition, this greatly facilitates fabrication and installation of the component parts. For example, this eliminates the need for exacting tolerance requirements in dimensioning the manifold in order to secure the proper butt weld at the opposed corners as well as at the juncture, as at 54, with the cold face member 8. Moreover, this enables the manifold to be installed, as a unit, over and in overlapping relation with respect to the cold face member 8 for positive assembly with a relatively reduced tolerance requirements with reduced stress concentrations at the weld points.

As best seen in FIG. 2, the lateral side edges 16 of the cold face member 8 extend interiorly of the manifold, as at 56, so as to be co-terminus with the interior extension of the terminal edge, as at 42 of the cold face member. Moreover, this provides a more controlled uniform flow of fluid through the extending channels 14 and the side rail channels 20 interiorly of the manifolds 32 and 34 so as to minimize any diffusion effect which would otherwise result in heat transfer losses to the exterior of the manifold. As seen in FIGS. 1 and 2, the headers or manifolds 32, and 34 are adapted to feed or exit water into or from the respective channels 14 between corrugations 12, or between the channels 14 and the side rail channels 20. The side rail channels 20 extend above the general plane of the cold plate member 8 an amount equal to the height of the side walls 16 and liner, provide added strength to the longitudinal edges of the panels while at the same time affording coolant flow.

In the invention, the securement of and spacing between the plates 8 and 10 is provided by a series of axially extending plug welds 60 disposed in the corrugations 12 between the channels 14. As best seen in FIG. 2, the welds 60 are symmetrically arranged in staggered relationship to one another accross the width of the cold plate 8 and preferably have a length of about 6 inches, except at the terminal ends, as at 62, wherein the weld length is proportionately reduced (e.g. 2-3 inches) dependent upon the length of the respective plates, etc. Moreover, the plug welds disposed at the confronting areas between the corrugations between the two plates or between the corrugations in one plate and the smooth inner face of the other plate provide sufficient rigidity and strength as permit dispensing with staybolts or the like. Avoiding the use of staybolts and separating strip minimizes the amount of welded areas and also reduces the nonuniformity of heat transfer and strains provided by a large number of welds. Excessive weld areas with consequent repeated heating-cooling cycles produce resultant cracks and separation of the panel elements, thereby requiring a greater frequency of replacements.

Figure 5:
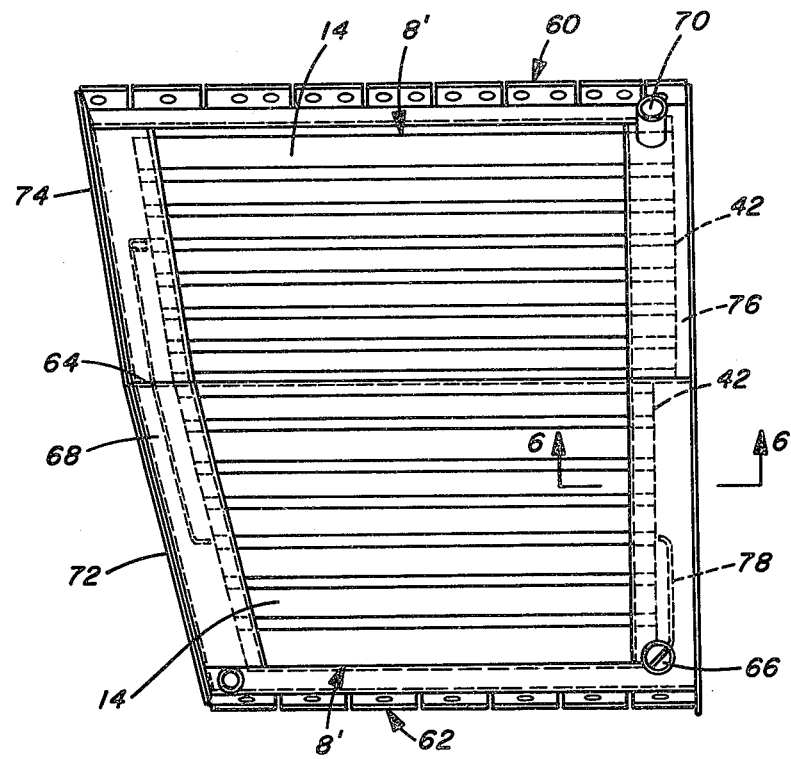
FIG. 5 is a top plan view illustrating a typical arrangement of the invention.

In FIGS. 5 and 6, there is shown a modification of the panel for application in the fabrication of a BOF hood transition elbow, for example. As shown, the panel illustrated includes a single hot face 10 and two cold face plates 8' separated at their midpoint by a tight full length corrugation, as at 64, for circulating fluid (water) from an inlet 66 through channels 14 in the panel through a manifold 68 and out through outlet 70. In this form, the hot and cold face plates may be angularly disposed relative to the full length corrugation 64 so as to diverge downwardly and outwardly from one another from the corrugation 64. For example, the cold face plates 8' on either side of the corrugation and the single hot face plate may be disposed so as to provide an included angle of about 60° so that the cold and hot face plates extend divergently outwardly and downwardly from one another on either side of the corrugation 64, as viewed looking from the right hand side of FIG. 5. In this form, one end of the panels may be angularly tapered, as at 72 and 74, in order to facilitate the installation for a particular location. Moreover, in this form the inner terminal edges, as at 42, of the cold face members 8 terminate a distance $x$ interiorly of the manifold 76 for the purposes as aforesaid. In some cases, the extension of the cold face plate 8' interiorly of the header or manifold 76 may be shortened, as at X', to accomodate a baffle or the like 78, as desired.

Figure 7:
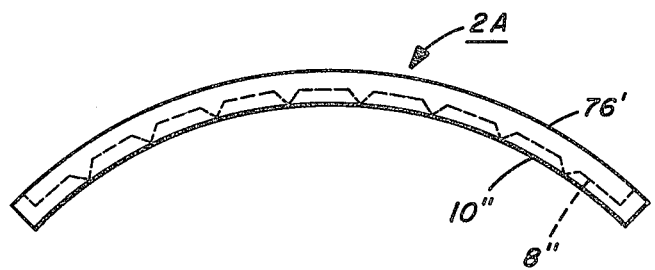
FIG. 7 is an elevation view showing another modified form of the panel of the invention.

In FIG. 7, there is illustrated another modified form of the panel 2A wherein the cold 8 inch and hot 10 inch face plates are curved rather than be disposed parallel to one another as in FIG. 1 or angularly disposed as in FIG. 5. For example, in this form, the plates are curved rather than angularly disposed as in FIG. 7.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

I claim:

1. A panel for use in internal cooling comprising,
a pair of oppositely disposed metal plate members,
said plate members being spaced apart and joined at their edges to provide a fluid transmitting passageway therebetween,
at least one of said plate members including integral laterally spaced continuous corrugations defining generally parallel channels in said passageway for directing fluid flow longitudinally in said panel,
manifold means disposed adjacent each of the opposed ends of said plate members and communicating with said channels,
said manifold means is of a box-like construction extending transversely across the width of said plate members, said box-like construction defined by an end wall, an inner wall and a top wall, said inner wall secured in fluid sealed relation to the confronting surface of said one plate member and axially inwardly of the terminal end edge thereof, one of said plate members terminating interiorly of one of said manifold means and in laterally off-set relation to said other plate member for controlling fluid flow interiorly of said manifold means, said one plate member includes integral upstanding side walls extending longitudinally thereof and secured in fluid sealed relation to the corresponding opposed sides of said other plate member, said side walls extending parallel to each other and interiorly of said manifold means, said inner wall being secured in fluid sealed relation at its opposed ends to said side walls axially inwardly of the respective ends thereof, a series of plug welds securing said one plate member to said other plate member, and said plug welds being disposed in the area of said corrugations between said channels.

2. A panel in accordance with claim 1, wherein said one plate member includes integral upstanding side walls extending longitudinally thereof, and said other plate member including integral upstanding side walls extending generally parallel to and secured to the side walls of said one plate member and defining hollow rail members extending lengthwise of said panels for communication with said manifold means.

3. A panel in accordance with claim 2, wherein said manifold means extends transversely across the width of said plate members, said manifold means including an end wall extending at right angles to said one plate member, a top wall secured to and extending transversely between said members and an inner wall disposed parallel to said end wall and disposed in fluid sealed relation along one edge with the confronting surface of said other plate member, and said inner wall secured at its opposed ends in fluid sealed relation to the side walls of said one plate member and axially inwardly of the free ends of said side walls.

4. A panel in accordance with claim 2, wherein said rail members are continuous with said one plate member interiorly of said manifold means, and said rail members having a greater cross-sectional area in transverse section, as compared to the channels defined by said corrugations.

5. A panel in accordance with claim 4, wherein said rail members extend in the same general plane with one another and with said manifold means, and said plane disposed above the general plane of said one plate member a distance equal to the height of the inner wall of said manifold means.

6. A panel in accordance with claim 1, wherein said corrugations are selected from the group consisting of linear and curved configurations in transverse section.

7. A panel in accordance with claim 6, wherein said one plate member contains said corrugations and said other plate member is of a generally flat construction.

8. A panel in accordance with claim 1, wherein said plug welds are symmetrically arranged in staggered relation accross the width of said plate member, and said plug welds being axially spaced apart in a lengthwise direction.

9. A panel in accordance with claim 1, wherein said one plate member includes a terminal end edge which terminates inwardly of the end wall of said manifold means, and said end edge is disposed to extend substantially parallel throughout its length in relation to the end wall of said manifold means.

10. A panel in accordance with claim 9, wherein one of said manifold means includes an inlet member for receiving a cooling fluid, and said terminal end edge spaced from the end wall of said manifold means by a distance in relation to the diameter of the inlet member in a ratio of 1:2.

11. A panel in accordance with claim 9, wherein the side walls of said one plate member which extend interiorly of said manifold means are coextensive in length with the terminal end edge of said one plate member, and said end edge extending substantially parallel throughout its length in relation to the end wall of said manifold means.

12. A panel in accordance with claim 1, wherein the inner wall of said manifold means is welded at its opposed ends to the confronting side walls of said one plate member and is welded at the juncture with the confronting upper surface of said one plate member.

13. A panel for use in internal cooling comprising, a pair of outwardly disposed metal plate members spaced laterally apart and joined at their edges to provide a fluid transmitting passageway therebetween, at least one of said plate members including integral laterally spaced on interrupted corrugations defining generally parallel channels in said passageway for directing fluid flow longitudinally through said panel, manifold means disposed adjacent each of the opposed ends of said plate members and communicating in fluid flow with said channels, said manifold means each being of a box-like construction extending transversely across the width of said plate members, said box-like construction defined by an end wall, and inner wall and a top wall, said inner wall secured in fluid sealed relation to the confronting surface of said one plate member and axially inwardly of the terminal end edge thereof, one of said manifold means including an inlet member and the other of said manifold means including an outlet member for directing cooling fluid into said one manifold means, through said passageway and out through said outlet member of said other manifold means, said one plate member including integral upstanding side walls extending longitudinally thereof and secured in fluid sealed relation to the corresponding opposed sides of said other plate member, said side walls extending parallel to each other and interiorly of said manifold means, said inner wall being secured in fluid sealed relation at its opposed end to said side walls axially inwardly of the respective ends thereof, said one plate member including a terminal end edge which terminates inwardly of the end wall of said manifold means,
said end edge extending substantially parallel throughout its length in relation to the end wall of said manifold means, and
the side walls of said plate members together defining hollow rail members extending lengthwise of said panels and communicating at their opposed ends with the associated manifold means.

* * * * *